United States Patent Office 3,463,260
Patented Aug. 26, 1969

3,463,260
HYDRAULICALLY STEERING DEVICES FOR VEHICLES
Frederick Baines and Frank Geoffrey Tunnell, Ilford, England, assignors to The Plessey Company Limited, Ilford, England, a British company
Filed Aug. 8, 1967, Ser. No. 659,117
Claims priority, application Great Britain, Aug. 10, 1966, 35,880/66
Int. Cl. B62d *5/00;* F15b *13/16;* F16h *35/00*
U.S. Cl. 180—79.2                      2 Claims

ABSTRACT OF THE DISCLOSURE

A master-cylinder unit operated by a steering wheel hydrostatically operates a slave cylinder by a pressure difference which acts on a spring-centred power control slide valve which at a given pressure removes the unloading of a power pump, whose output it directs to the low-pressure side of the master unit while draining the low-pressure side of the slave cylinder to the sump of the pump. Non-return valves in the slide valve permit, when the valve is centered, fluid from the valve cylinder to operate the master-cylinder unit, thus allowing the vehicle to steer itself when being towed.

---

Figure 1:
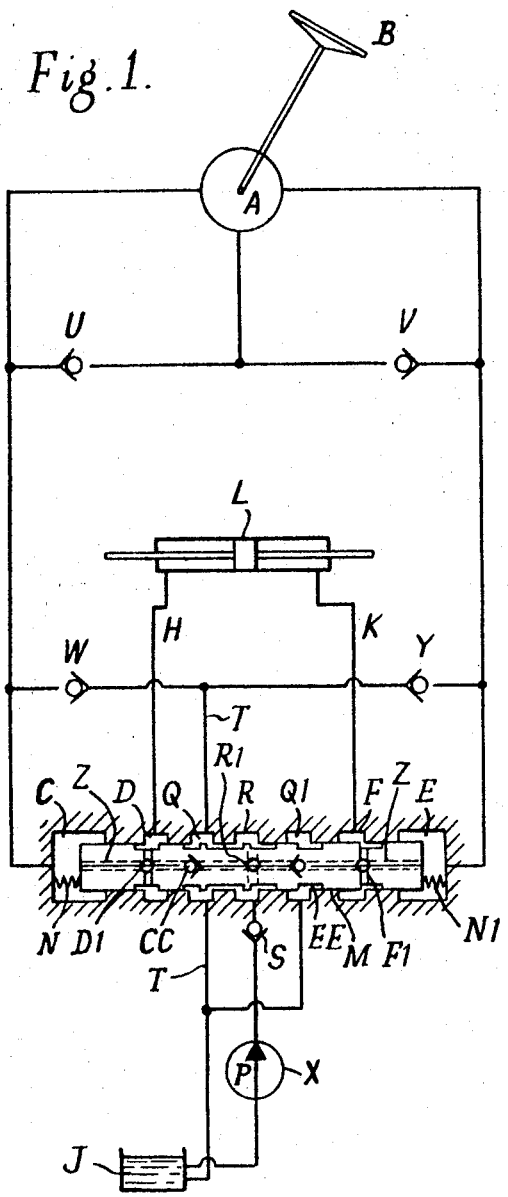

This invention relates to hydraulic steering devices for vehicles and has for an object to provide an improved hydrostatic steering system of reasonably simple construction which normally employs power from a hydraulic power source to assist steering against heavy resistance, while also being capable of allowing the vehicle to steer itself, for example, when being towed, and ensuring continued hydraulic operation of the system by manual forces applied to the steering wheel in the case of failure of the hydraulic power source.

A further object is to provide such system having a spool valve requiring a minimum number of lands, thus permitting its axial length to be kept relatively short.

A still further object is to provide such system in which the spool valve element can be made with a single axial through bore.

According to the present invention a master-cylinder device actuated by the steering wheel, preferably a rotary displacement pump capable of an indefinite amount of rotation, for example, a metering pump constructed as a two-lobed sliding-vane meter, has its two sides respectively connected to the two sides of a slave-cylinder unit by two lines respectively communicating with the two ends of the bore of a control slide valve which is spring-urged to a central position in which a fixed-displacement pump, serving as a sourre of fluid pressure, is unloaded whilst creation, by the master-cylinder device, of a pressure difference beyond a predetermined value produces displacement of the slide valve against the centering spring, causing said valve to close the unloading circuit of the pump and admit liquid supplied by the pump to the lower-pressure side of the master-cylinder device while disconnecting the lower-pressure side of the slave cylinder from the master-cylinder device and connecting it to a low-pressure return line so that the pressure effective in the slave cylinder unit is equal to the sum of the manually produced master-cylinder pressure and the pressure supplied by the pump to the other side of the master-cylinder device.

Preferably the slide-valve element or the housing of the control valve has a longitudinal passage which connects the two chambers facing the end surfaces which are respectively under the pressures of the two sides of the master cylinder, a central point of this bore being in constant communication with the admission line for pressure from the pump and is separated by non-return valves from two opposite end portions of this passage which respectively communicate with the chambers facing said end surfaces and with service ports for the two ends of the slave cylinder, the non-return valves being arranged to permit flow only from said central point towards the end portions of the passage.

This enables the master cylinder, when the steering wheel is unrestrained, to follow steering movements applied to the wheels, for example, when a vehicle is being towed. The arrangement is also believed to be conducive to a relatively simple form of the control valve.

In the preferred arrangement the lines interconnecting the two sides of the master cylinder with the respectively associated ends of the control valve are each connected via a non-return valve to a liquid reservoir to ensure that the low-pressure side of the master cylinder remains always full of liquid.

Figure 2:
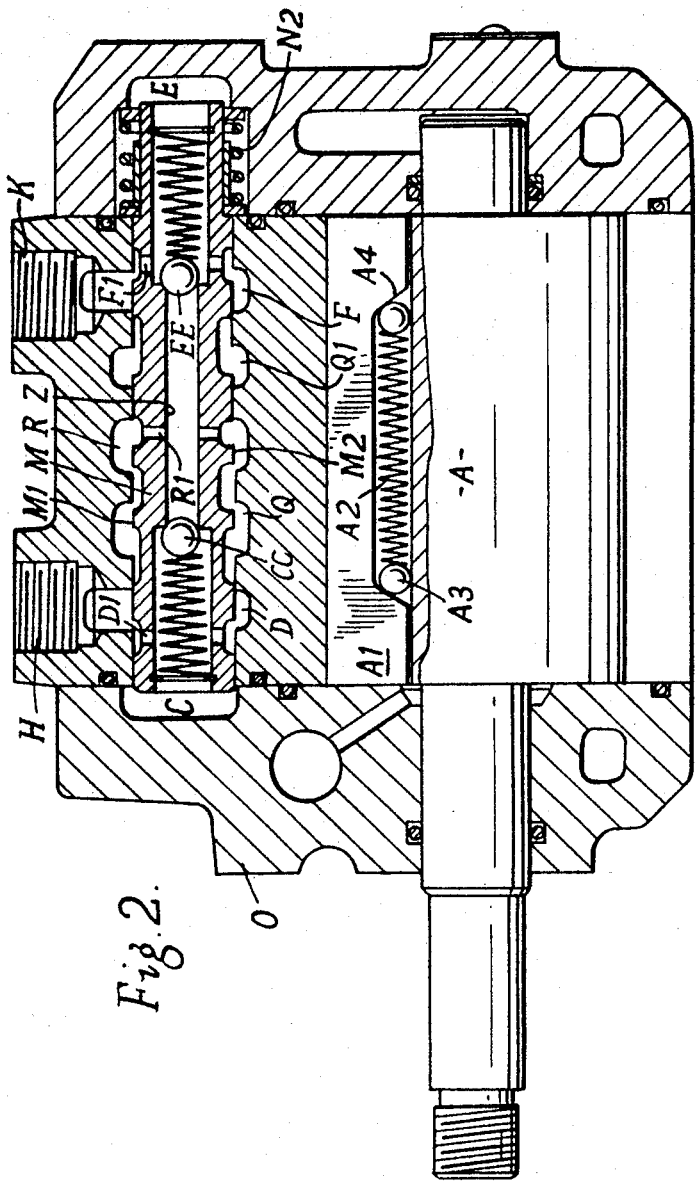

An embodiment of the invention is illustrated in the accompanying drawings, in which:

FIGURE 1 is a diagram of a power-assisted steering system incorporating one form of the invention, and FIGURE 2 is an axial section of a practical form of combined master-cylinder-and-valve unit suitable for use in that embodiment.

Referring now first to FIGURE 1, this figure illustrates the system in its condition of rest which it maintains while a vehicle equipped with it is travelling along a straight path. Any convenient mechanical steering linkage, not shown, is connected to the piston of a slave cylinder L whose two ends are connected through lines H and K respectively with service ports D and F in the housing of a slide-valve device M the valve element of which is a spool-type valve piston. The two ends of the latter are arranged respectively in chambers C and E which each communicate with one side of vane displacement device A having two sliding vanes $A_1$ (see FIGURE 2), which constitutes a master-cylinder unit, and which is coupled for common movement with the steering wheel B of the vehicle. The spool-type piston of the slide valve device M is normally held in its illustrated central position along its bore by springs N, $N_1$ which are preloaded so as to maintain the valve piston in its central position unless there is an unbalancing force exceeding a predetermined limit. It has a longitudinal through bore Z intersected by axially speed cross-bores $D_1$, $R_1$ and $F_1$ and subdivided between the cross-bore $R_1$ and each of the other two cross-bores by non-return ball valves CC and EE which permit flow from cross-bore $R_1$ towards each of the cross-bores $F_1$ and $D_1$ but not flow in the opposite directions. In the illustrated central position of the valve the ports D and F respectively communicate with the cross-bores $D_1$ and $F_1$ and thus with the end chambers C and E.

Accordingly when the steering wheel B is turned to deliver liquid to the chamber C, the corresponding pressure increase in the line from the master unit A to the valve end chamber C is communicated to the appropriate side of the slave cylinder L by bores Z and $D_1$ and line H to move the piston of slave cylinder L towards the end attached to line K, while liquid from line K is free to return to the other side of the master-cylinder unit A via port F, bores $F_1$ and Z, and chamber E. The delivery of a fixed-displacement pump X drawing liquid from a tank J, reaches, via a non-return valve S, a central port R in the housing of the valve M, and since the valve piston M is in its central position, this liquid is allowed to return to the tank J via a return port Q and a line T which opens in the tank at a level below that from which the pump X draws its liquid. The non-return valves CC and EE are both closed in this condition since the pump X is unloaded. If the resistance by the steering linkage to the steering movement exceeds a predetermined value, the pressure applied by the master-cylinder unit A to the slave cylinder L via line H reaches a value in which its action in chamber C overcomes the force of loading spring $N_1$ and displaces the spool-type piston of the valve device M towards the right-hand side of the figure, to a position in which a lands $M_1$; see FIGURE 2, of the valve element cuts off the connection between pump-delivery port R and return port Q, thus preventing the direct return of pump delivery to the tank and causing a build-up of pressure in port R. The pressure thus built-up in port R will open the non-return ball valve EE and will, via the bore Z and chamber E, reach the lower-pressure side of the master-cylinder unit A. It will thus act on the unit A to assist the torque applied to it by the steering wheel B. The same displacement of the valve piston M isolates the port F, which through line K communicates with the lower-pressure side of the slave cylinder L, from bore $F_1$, thus severing its connection via bore Z and chamber E with the master-cylinder unit A, and establishes instead a connection from port F to return port $Q_1$ which allows the liquid from the low-pressure side of the slave cylinder L to return to the tank J from which the pump X draws its liquid.

It will be observed that in these circumstances, although the pressure difference acting in the slave cylinder L has been increased by the amount of pressure delivered by the pump X, the pressure difference acting on the piston of valve device M is still determined only by the pressure manually generated by the operation of the steering wheel B, since the pressure created in chamber E by the supply of liquid from the pump X is balanced by an equal pressure in chamber C, which, due to the action of the pump pressure on the reverse side of the master-cylinder unit A, is superimposed upon the pressure generated in chamber C by the operation of the steering wheel B. Accordingly, as soon as the application of manual force to the steering wheel B ceases, the piston of valve M will return to its normal central position in which the pump X is unloaded, so that the steering operation remains under full manual control.

Should, under conditions in which the required steering force is sufficient to displace the valve M from its central position, the supply of pressure from the pump X fail, a non-return valve S will isolate the port R from the pump X, but the low-pressure side of the slave cylinder L will, due to displacement of the valve N, remain in communication with the sump J. In order to ensure that the hydraulic system will nevertheless remain filled with liquid, ready for any subsequent steering operation in the reverse direction, and thus to ensure continued manual operation in the case of failure of the hydraulic power source, each of the lines that connects the two sides of the master-cylinder unit A with the chambers C and E, respectively, communicates through a non-return valve W or Y with the tank-return line T so that the low-pressure side of the master-cylinder unit A is always connected to a supply of hydraulic liquid. Even in the case of a breakage in the delivery line of pump X this manual operation is always ensured, due to the fact that the opening of the return line T in the tank J is arranged at a lower point than that of the suction line of the pump X, so that the liquid level in the tank J can not be caused to fall to or below the level of the opening of line T by spillage of liquid from the tank J under the action of the pump X.

The arrangement of the invention also enables a vehicle to steer itself, for example, when it is towed. In this case the steering wheel, and thus the displacement device A, can rotate freely in either direction, so that the control valve device M will be held by its springs N, $N_1$ in the illustrated centre position. Assuming now that in a bend the wheels of the vehicle exert on the piston L of the slave cylinder a force towards the left of FIGURE 1, liquid will be expelled from the slave cylinder through line H and service port D into the left-hand portion of bore Z and, as the non-return valve CC will close, will flow through end chamber C to the displacement device A. The latter will turn the steering wheel B in accordance with the steering movement of the slave cylinder piston L and direct an equal flow of liquid via chamber E, the right-hand end portion of bore Z, port F, and line K to fill the vacated space at the right-hand side of the slave-cylinder piston L.

If desired the bore Z in the valve element may be replaced by an equivalent passage in the valve housing.

While a steering operation in only one direction has been described in detail, it will be readily appreciated that due to the symmetry of the apparatus, steering operations in the opposite direction are performed in an exactly corresponding manner, so that any description thereof would be merely repetitious. Furthermore, while the invention is not limited to any particular construction of the master-cylinder device, the construction described in our co-pending patent application Ser. No. 659,118 is believed to be particularly convenient for the purpose.

The valves shown at U and V are inserted in the circuit to give a continuous pressure to the base of the vanes in the vane type displacement device A. This is a normal manner of pressure-loading these vanes and is well known. In the case where the device A is of different construction, these valves may not be required. It will also be found that, as long as the pump X is working, the resistance met by the flow from port Q to the tank will ensure that some slight pressure is always maintained in the system and, via the non-return valves CC, EE, W and Y, will make the system self-purging of air and always fully primed by the pump, even while the control valve M is in its central, neutral position, the pump X making up any small loss of liquid.

In the practical embodiment, illustrated in FIGURE 2, the valve device M is accommodated in a common housing body with a master-cylinder device A of the kind described in said co-pending application. The axes of the said device and the valve device M are arranged parallel to each other. One of the vanes of the device is shown at $A_1$. It is urged into contact with the housing bore by a spring $A_2$ which urges two balls $A_3$ against oppositely inclined cam surfaces $A_4$ of the vane.

In this combined device the return-spring arrangement for the valve M has been slightly modified inasmuch as a single pre-loaded spring $N_2$ is arranged to effect in a known per se manner the centralising of the valve against displacements in either direction.

What we claim is:

1. A vehicle power-steering device comprising, a spring-centered open-centre spool valve; a manually operated master cylinder device, a power operated pump; and a servo-cylinder device, said spool valve including a valve housing and a valve spool, said valve housing having an inlet port connected to the outlet of said power operated pump, two service ports respectfully connected to the two ends of said servo-cylinder device, and a spill port between each said service port and said inlet port, said valve spool having a longitudinal through-bore and a central cross-bore, the two ends of said valve housing communicating respectively with the two sides of said master cylinder device, and said central cross-bore permanently communicating to said inlet port, said spool being adapted to cooperate with said service ports to permit each of said service ports to communicate with one end of said valve housing when said valve spool is in a neutral position while, on displacement of said valve spool to either side of said neutral position by a pressure difference between the two ends of said valve housing, the service port adjacent to the lower-pressure end of said valve housing is cut off from its associated end of said valve housing and permitted to communicate with the spill port interposed between said service port and said inlet port, said spool including two non-return valves in the longitudinal bore thereof permitting flow from said central cross-bore to each end of said housing and its respective service port when released, but preventing flow from such end and service port to said central cross-bore.

2. A device as claimed in claim 1, wherein said valve spool is formed with two outer cross-bores longitudinally spaced from said center cross-bore to communicate with the corresponding service ports when said valve spool is in said neutral position, each of said cross-bores intersecting said longitudinal bore to provide, in conjunction therewith, communication between each of said service ports and its respective end of said valve housing in said neutral position, each of said non-return valves being disposed respectively within said longitudinal bore between said central cross-bore and one of said outer cross-bores.

References Cited
UNITED STATES PATENTS

| | | | |
|---|---|---|---|
| 2,252,660 | 8/1941 | Kulikoff | 180—79.2 |
| 2,403,325 | 7/1946 | Armington | 60—52 X |
| 2,521,652 | 9/1950 | Rockwell. | |
| 2,836,960 | 6/1958 | Wittren | 60—52 |
| 3,246,472 | 4/1966 | Kries | 180—79.2 X |

BENJAMIN HERSH, Primary Examiner

JOHN A. PEKAR, Assistant Examiner

U.S. Cl. X.R.

60—52; 74—388; 91—388